Patented June 17, 1930

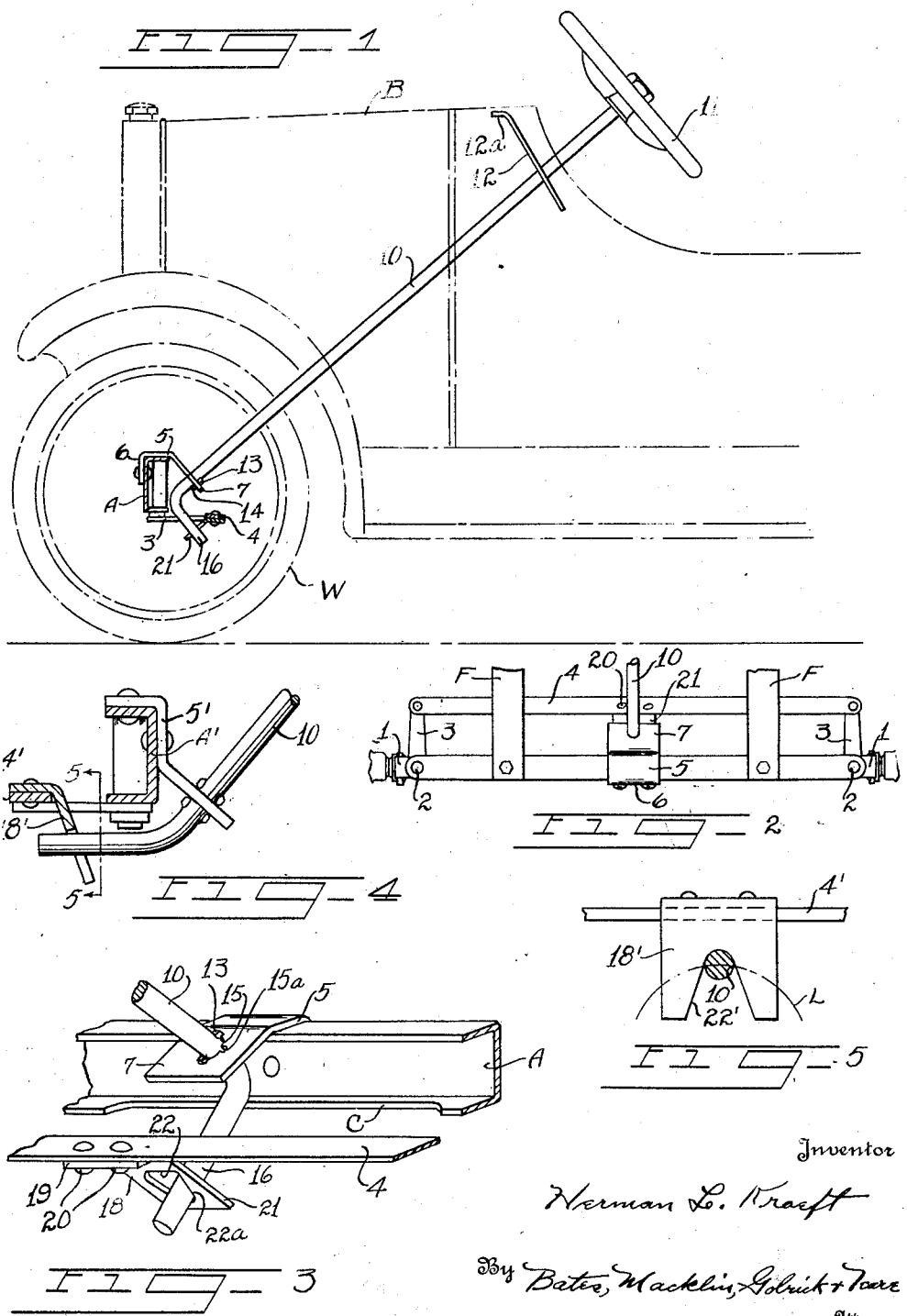

1,764,730

UNITED STATES PATENT OFFICE

HERMAN L. KRAEFT, OF EAST CLEVELAND, OHIO, ASSIGNOR TO THE MURRAY OHIO MANUFACTURING COMPANY, OF CLEVELAND, OHIO, A CORPORATION OF OHIO

STEERING MECHANISM

Application filed March 23, 1927. Serial No. 177,508.

This invention relates to juvenile vehicles particularly to steering mechanism for such vehicles. An object is to provide a simple and easily manufactured and assembled steering mechanism for vehicles of this type.

More specifically an object is to provide a steering mechanism, the parts of which may be shipped to dealers or ultimate users in a "knock-down" condition and which may be quickly and accurately assembled by such dealers or users without the aid of special tools and without the exercise of special skill.

Further objects and features of the invention will become apparent from the following description relating to the accompanying drawings wherein I have shown a preferred embodiment. The essential characteristics are summarized in the claims.

In the drawings Fig. 1 is a side elevation of my mechanism, a conventional form of front axle being shown in transverse cross-section and the vehicle body being shown in broken lines; Fig. 2 is a plan view showing a front axle with the usual steering knuckles and showing the relative position of the steering post and associated parts; Fig. 3 is a perspective view showing part of the front axle with my mechanism attached hereto; Fig. 4 is a view similar to Fig. 1 of the invention as applied to a differently arranged steering mechanism; and Fig. 5 is a sectional view as indicated at 5—5, Fig. 4.

The invention, as illustrated, is embodied in a steering post having an upper and lower bearing support, the lower end of the post being bent to provide a laterally swinging arm and the arm engaging an opening in a clip or bracket rigid with the usual tie-bar for connecting the steering knuckles. The parts are associated in such manner that there is practically no binding action between the arm and bracket and at the same time there is the necessary snug fit between these parts to insure proper steering of the vehicle.

Referring in detail to the drawing, a conventional auto body is indicated at broken lines at B, a pair of front steering wheels at W and a channel shaped front axle beam at A. The usual arrangement for controlling the position of the wheels comprises pivoted steering knuckles, such as shown at 1 attached by suitable pivot pins or bolts as at 2 to the ends of the axle beam. Each of these knuckles has an arm 3 which arms are connected by a tie-bar 4 upon which my mechanism operates through the knuckles to steer the vehicle. One end of the tie-bar may be riveted to one arm but the other is preferably secured by a removable bolt. This will be more fully explained.

Intermediate of the usual side frame members F and shown as rigidly but removably secured to the axle beam is a bracket 5. This bracket as shown comprises a twice bent section of sheet metal having a top portion resting on the upper flange of the channel forming the axle beam, and a downwardly bent forward portion 6 which may be removably secured or riveted to the web of the channel. Forwardly of the upper axle beam flange the member 5 inclines downwardly as at 7 and is perforated to receive the lower end of a steering post 10. The post has the usual steering wheel 11 at its upper end. The conventional instrument board 12, suitably perforated to receive the post and flanged as at 12$^a$ to provide for securing the board to the cowl portion of the body supports the upper end of the steering post.

Means for preventing endwise movement of the post comprises, as shown, pairs of nibs 13 and 14 upstruck in a known manner from the metal of the steering post and bearing against the opposite surfaces of the inclined portion 7 of the member 5. These nibs may be formed on the post previous to assembling it in the bracket 5 by reason of providing recesses 15$^a$ corresponding to the position of the nibs on the post, and formed at the sides of the opening 15. Such recesses are made large enough to allow one pair of nibs 14 to pass freely therethrough when these nibs are in registration therewith. Afterwards when the post is turned to its normal operating position the nibs engage the upper and lower surfaces of the bracket at all times, the operating movement of the post being through such an angle that during operating the nibs will never align with the recesses. In assembling the post into its supports the wheel is removed and the upper end thrust upwardly through the described openings in the bracket 5 and the instrument board, a portion of the lower flange of the axle beam being shown as removed to allow this as at C.

The lower end of the steering post is bent substantially at right angles in Figs. 1 and 3 to form an arm 16, which connects with the tie-bar to shift it to the right and left, as the wheel 11 is turned. The connection between the arm 16 and the tie-bar comprises as shown, a bracket member 18 having a rearward portion 19 suitably secured as by rivets to the tie-bar and having a forwardly and downwardly inclined portion 21 having a triangular shaped recess or opening 22 therein to receive the portion 16 of the post. This triangular shaped opening embraces the arm as at 22ª closely enough to prevent excessive side play of the wheels irrespective of the turned position of the post in steering, the upper enlarged end of the opening permitting such turning and also allowing the easy insertion of the arm even though the upper end of the post is held by the instrument board as will be hereinafter seen. As the steering wheel is turned, the whole tie-bar is shifted forwardly by reason of the steering knuckles swinging about their pivots. This will be apparent from Fig. 2. The result is that the member 16 moves toward the less restricted portion of the opening 22 and, because the side surfaces defining the opening diverge, there will be no binding action between the members 16 and 18. The exact shape of the opening is immaterial but it should be of such shape (as determined by the shifting movement of the tie-bar) as to allow free movement of the arm without side play. The depending portion 21 may be warped if desired to cause the arm to bear directly against the sides of the opening as it moves upwardly relative thereto, but for a juvenile vehicle this is an unnecessary refinement.

A particular advantage of my construction, in addition to the simplicity and cheapness of manufacture of the various parts, resides in that the steering post may be stored or shipped separately from the chassis and body to save storage and packing space, yet it may be quickly and easily assembled with these parts. This is particularly advantageous where it is desired to ship or store the chassis separately from the body as in such case the steering post occasions considerable lost packing space. Assuming that all the above described parts, except the steering post, (the wheel being removed) are received by the buyer of the vehicle in assembled condition, the buyer in order to completely set up the vehicle simply threads the end of the steering post through the bracket 5 and the instrument board 12, threading it through the bracket by turning it to allow the upper nibs to pass through the recesses 15 and then turning it back to normal position as described. Afterward he removes one end of the tie-bar from the respective steering knuckle and swings the perforated plate 18 over the bent end of the post, then reattaches the tie-bar, and finally attaches the steering wheel.

As shown in Figs. 4 and 5 the tie-bar is positioned forwardly of the axle beam, this being an expedient in a body construction wherein the distance between the seat and front axle is such that, there is a possibility of interference between the child's feet and the steering mechanism, when propelling the vehicle. In this form the bracket for supporting the lower end of the post is indicated at 5' the tie-bar clip or connection plate at 18', tie-bar at 4' and axle beam at A'. The bend in the post for this form is substantially less than for the previously described form. Instead of a triangular perforation the plate 18' has an open downwardly diverging slot 22'. Assembling of parts is accomplished substantially as with the previously described form although with the open slot the bent arm may be sprung into place, the tie-bar being simultaneously sprung downwardly.

When steering the end of the bar moves substantially as indicated by the broken line L and there is no binding between the arm and plate as the arm inclines with relation to the plate because as the angle between the arm and plate decreases the size of the slot increases. Any suitable means may be employed to limit the throw of the tie-bar to the right and left wherefore the arm will not disengage the slot; this being common practice, no such means is illustrated.

I claim:

1. Steering mechanism for a vehicle having the usual steering knuckles and a tie-bar, a bracket removably secured to the vehicle and having an opening therein, a steering post arranged to enter said opening and having a laterally extending arm, means for preventing longitudinal movement of the post with reference to the bracket, and a recessed member rigid with the tie-bar, the sides of the recess being relatively diverging and arranged to embrace the said arm.

2. Steering mechanism for a juvenile vehicle wherein there are dirigible wheels, steering knuckles therefor and a tie-bar connecting the knuckles, a steering post having a laterally extending arm at its lower end, means for rotatably supporting the post at two points and a recessed member adapted to be secured to the tie-bar, both sides of the recess being substantially in engagement with the arm at each side thereof when the arm is in central position, the embracing surfaces diverging whereby the arm may be turned with reference to the member while in said recess without binding.

3. Steering mechanism for a juvenile vehicle comprising a steering post rotatably secured to the front axle and body of the vehicle, means for preventing longitudinal movement of the post, a laterally movable bar with connections for turning the wheels, an arm on the steering post positioned to be moved when the post is turned, and a sheet metal member having an open recess extending from its edge and converging inwardly for receiving said arm, said sheet metal member being rigid with said bar.

4. In a steering mechanism for a vehicle, a steering post comprising a round bar, a laterally extending arm carried by the lower end of the bar, a perforated bracket carried by a frame part of the vehicle, the perforation having a lateral recess at one side thereof, projections formed on the post, one of which is adapted to enter said recess when the post is turned to a predetermined position relative to the bracket, said projections being spaced apart substantially the thickness of the said bracket whereby when the steering post is turned to various operating positions, the projections prevent the longitudinal movement of the post with reference to the bracket, a laterally movable member with connections to the vehicle wheels to turn them, and means connecting the last mentioned member with the arm.

5. In combination with a juvenile vehicle front axle assembly comprising a rigid axle beam member, steering knuckles and tie-bar connecting the knuckles, said tie-bar being positioned forwardly of the beam, a rearwardly extending bracket secured to the axle beam and a steering post rotatably secured to said bracket, means for supporting the upper end of the post, said post being bent at its lower end to extend past the axle beam, and a plate having an open recess at its lower edge embracing the bent end of the post, said plate being connected to the tie-bar.

6. In a steering mechanism for a juvenile vehicle, a frame and dirigible steering wheels mounted thereon, a steering post, means detachably connecting the post with the dirigible wheel, means on the frame for supporting the post, and interengaging means between the post and post supporting means arranged to normally prevent longitudinal movement of the post but arranged to permit longitudinal movement thereof, for removal and replacement of the post, when the post is disconnected from the dirigible wheels by said first named means, and the post is then turned to an abnormal position.

In testimony whereof, I hereunto affix my signature.

HERMAN L. KRAEFT.